United States Patent Office

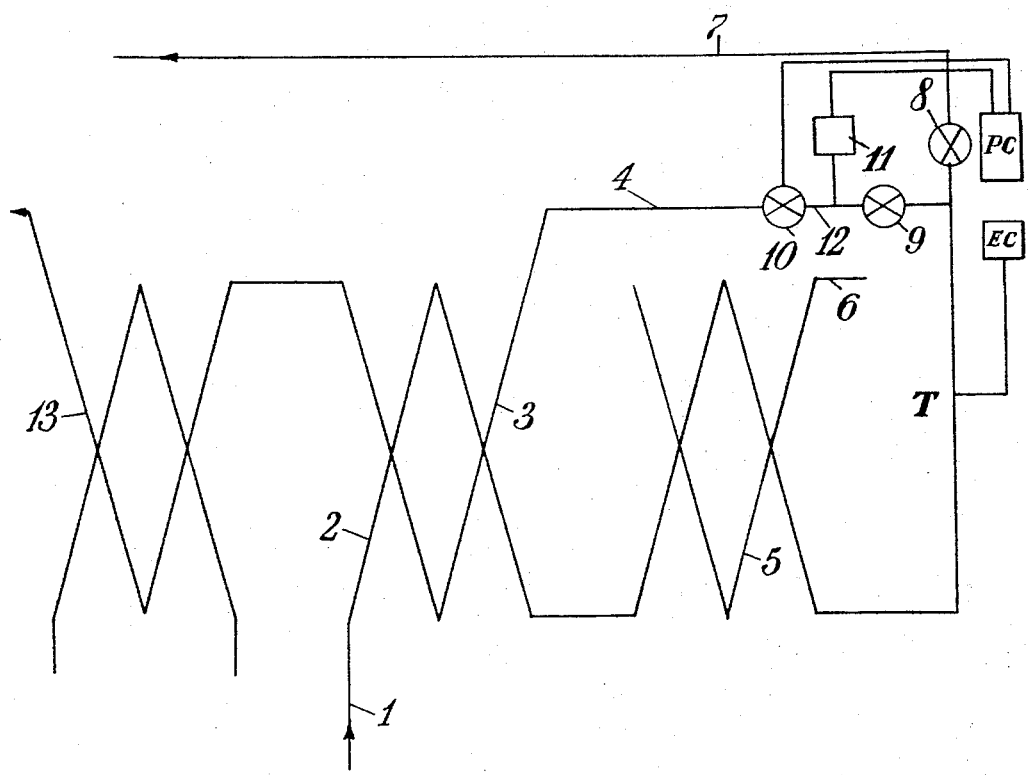

3,444,891
Patented May 20, 1969

3,444,891
FLOW DIVERSION CONTROLS
Harry Christopher Cooper, Crawley, England, assignor to The A.P.V. Company, Limited, Crawley, England, a British company
Filed Jan. 27, 1966, Ser. No. 523,395
Claims priority, application Great Britain, Jan. 27, 1965, 3,522/65
Int. Cl. F17d *3/00;* G05d *11/02*
U.S. Cl. 137—608       5 Claims

ABSTRACT OF THE DISCLOSURE

The invention provides a novel arrangement of simple valves in a thermostatically controlled flow diversion arrangement in a liquid product heat treatment plant. Instead of the conventional complex valve which opens a diversion line and closes the normal output line in one operation there is provided an arrangement of three simultaneously operable valves, one of which is thermostatically controlled to open and close the diversion line and the other two are in series in the output line and operable simultaneously with the said one valve. The space between the two valves is pressurized when they are closed to prevent leakage of a completely sterilised product into the output line.

---

This invention relates to flow diversion controls.

In continuous heat treatment plant, such as that used in the pasteurization, or ultra-high temperature treatment of milk, beer, fruit juices and other potable liquids, it is usual to provide a diversion valve at the outlet of the final heating section. The purpose of this valve is to divert the product which is below heat treatment temperature away from the cooling sections on the finished product side of the plant. This is necessary to ensure that untreated product neither leaves the plant nor enters the finished product side where it could contaminate this section, which is rendered sterile before the process is started.

On some plants, notably ultra high temperature milk sterilisation plant, the flow diversion valve operates under pressure when the flow is diverted. In this condition there must be no risk of leakage through the valve into the finished product cooling sections. The general method of safeguard which is provided takes the form of a double seated valve which closes both the outlet port from the valve and the inlet connection to the finished product sections and provides between the two seats a leakage space connecting with the atmosphere.

Whilst this method provides a positive safeguard, it is not wholly satisfactory in that it cannot be conveniently cleaned in place by circulating cleaning solutions through it. This arises because product invariably enters the leakage space and it is then difficult to reach with the cleaning solutions.

In order to overcome this difficulty, a flow diversion control according to the invention comprises a valve adapted to open or close a product diversion line, a pair of valves in series in the product output line and adapted to close or open simultaneously with opening or closing of the valve in the diversion line, and means for pressurising the part of the output line between the said pair of valves when they are closed.

If the said part of the output line is pressurised to a pressure greater than the pressure of the product as it passes into the diversion line then any leakage past the first of the pair of valves must be in a direction out of the output line towards the diversion line so that there is no danger of contaminating the finished product of the plant.

The invention will be further described with reference to the accompanying drawing, which is a diagrammatic representation of a preferred form of flow diversion control according to the invention.

Referring to the drawing, it will be seen that raw or partially processed product, e.g. milk, is fed in via a line 1 to one side 2 of a regenerating heat exchanger where it is in indirect heat exchange with processed product in the other side 3, which forms part of the product output line 4. The product passes from the side 2 to a treatment heat exchanger 5 where it is in indirect heat exchange relationship with steam, or other heating medium from a line 6. From the exchanger 5 the product reaches a flow diversion control arrangement of valves which pass it either to the output line 4 or to a diversion line 7 depending on the temperature of the product leaving the heat exchanger.

The arrangement preferably comprises "Zephyr" automatically and remotely controlled air operated valves controlled by a thermostat T exposed to the product between the heat exchanger 5 and the arrangement of valves. The thermostat energises an electrical control EC which emits a control signal to a pneumatic control PC controlling the valves and a pressurising means. The arrangement comprises a valve 8, controlling the diversion line 7 and normally closed when product temperature is high enough, and valves 9 and 10 in series controlling the product output line and normally open when the product temperature is high enough. When the temperature of the product falls below the prescribed level the valve 8 is opened and the valves 9 and 10 are closed. Simultaneously a pressurising means 11 is operated to pressurise the section 12 of the line 4 between the valves 9 and 10 to prevent leakage of product past the valve 9 into the line 4.

The section 12 between valves 9 and 10 could be pressurised by means of steam or compressed air applied directly. Alternatively a piston, plunger, bellows or diaphragm could be used, which would be loaded by a spring, compressed air or any other suitable medium. When using a plunger or similar device, it is also possible to detect leakage by the movement of the device, and this can then be used to operate a switch which in turn could operate a warning device.

This system has no passage communicating with atmosphere and is therefore easily cleaned in place.

The output line 4 also includes a cooling section 13.

Various modifications may be made within the scope of the invention. Thus while the arrangement has been particularly described in relation to a U.H.T. milk treatment plant it could readily be applied to any of a wide range of process plants requiring a flow diversion valve.

I claim:

1. In a product heat treatment plant having a heat treatment heat exchanger product output line and a flow diversion line: a control arrangement for the flow diversion line comprising a thermostatically controlled valve in the flow diversion line operating to open the flow diversion line when the temperature of the product leaving the heat exchanger is below a predetermined level and to close the flow diversion line when the temperature is above the said predetermined level, a pair of valves in series in the product output line operating to open and close simultaneously with closing or opening respectively of the valve in the flow diversion line, and means for pressurising the part of the output line between the said pair of valves when the latter are closed.

2. The structure as claimed in claim 1, wherein each of the valves is a remotely controlled air operated valve.

3. The structure as claimed in claim 1, wherein the pressurising means is a source of compressed air adapted to be applied directly to the said part of output line.

4. The structure as claimed in claim 1, wherein the pressurising means is a source of steam adapted to be applied to the said part of the output line.

5. The structure as claimed in claim 1, wherein the pressurising means comprises a movable element acting on the said part of the output line, and external means for loading the movable element.

References Cited

UNITED STATES PATENTS

| | | | |
|---|---|---|---|
| 1,776,363 | 9/1930 | Manning | 137—312 |
| 1,826,941 | 10/1931 | La Mont | 137—312 |
| 2,405,127 | 8/1946 | Beach | 137—608 |
| 2,510,513 | 6/1950 | Mueller et al. | 137—608 XR |
| 2,851,053 | 9/1958 | Wollner et al. | 137—595 XR |
| 2,988,279 | 6/1961 | Irwin | 137—608 XR |
| 3,118,463 | 1/1964 | Lacart | 137—608 XR |
| 3,143,142 | 8/1964 | Okaniwa et al. | 137—637 XR |

SAMUEL SCOTT, Primary Examiner.

U.S. Cl. X.R.

137—119